(12) United States Patent
Komarek

(10) Patent No.: US 8,376,410 B2
(45) Date of Patent: Feb. 19, 2013

(54) PORTABLE DATA STORAGE MEDIUM

(75) Inventor: Peer-Alexander Komarek, Baldham (DE)

(73) Assignee: Giesecke & Devrient GmbH, Munich (DE)

( * ) Notice: Subject to any disclaimer, the term of this patent is extended or adjusted under 35 U.S.C. 154(b) by 329 days.

(21) Appl. No.: 12/513,988

(22) PCT Filed: Nov. 7, 2007

(86) PCT No.: PCT/EP2007/009646
§ 371 (c)(1),
(2), (4) Date: May 7, 2009

(87) PCT Pub. No.: WO2008/055670
PCT Pub. Date: May 15, 2008

(65) Prior Publication Data
US 2010/0007130 A1    Jan. 14, 2010

(30) Foreign Application Priority Data

Nov. 8, 2006 (DE) .......................... 10 2006 052 651

(51) Int. Cl.
*B42D 15/00* (2006.01)
(52) U.S. Cl. .............................. 283/77; 283/904; 283/94
(58) Field of Classification Search .................... 283/72, 283/77, 94, 904
See application file for complete search history.

(56) References Cited

U.S. PATENT DOCUMENTS

| | | | |
|---|---|---|---|
| 2,604,710 A * | 7/1952 | Beaune | 283/71 |
| 4,544,181 A | 10/1985 | Maurer | |
| 5,145,212 A | 9/1992 | Mallik | |
| 5,350,198 A | 9/1994 | Bernecker | |
| 5,421,619 A | 6/1995 | Dyball | |
| 2003/0173406 A1 | 9/2003 | Bi | |
| 2008/0284157 A1 * | 11/2008 | Muke et al. | 283/86 |

FOREIGN PATENT DOCUMENTS

| | | |
|---|---|---|
| DE | 2907004 B1 | 8/1980 |
| DE | 4134539 A1 | 4/1993 |
| EP | 0283233 A2 | 9/1988 |
| EP | 0328086 A2 | 2/1989 |
| EP | 0372837 A2 | 6/1990 |
| EP | 1388808 A1 | 2/2004 |
| EP | 1527903 A2 | 5/2005 |
| FR | 2449930 A | 9/1980 |
| WO | 0073088 A1 | 12/2000 |
| WO | 03096595 A2 | 11/2003 |

OTHER PUBLICATIONS

International Search Report in PCT/EP2007/009646, Feb. 18, 2008.

* cited by examiner

*Primary Examiner* — James Kramer
*Assistant Examiner* — Kristina Junge
(74) *Attorney, Agent, or Firm* — Bacon & Thomas, PLLC

(57) ABSTRACT

A portable data carrier (1) includes a carrier (2) which has a first graphical representation (3) and a second graphical representation (4). The second graphical representation (4) is better protected against tampering than the first graphical representation (3). In addition, the second graphical representation (4) is configured as a reference for detecting tampering with the first graphical representation (3). Only a partial area (5) of the first graphical representation (3) laterally overlaps with the second graphical representation (4) and there is no lateral overlap between the first graphical representation (3) and the second graphical representation (4) outside the partial area (5).

21 Claims, 2 Drawing Sheets

PORTABLE DATA STORAGE MEDIUM

FIELD OF THE INVENTION

This invention relates to a portable data carrier. The invention relates further to a method for producing a portable data carrier.

BACKGROUND

Portable data carriers are used for example in cashless payments, in access controls, as identification documents, etc. Many applications use portable data carriers having graphical representations. Insofar as the graphical representations are security-relevant, they should be protected against tampering. The graphical representations may be for example a photograph of the owner of the portable data carrier.

From U.S. Pat. No. 5,421,619 it is known to apply a strip of recording material for laser inscription to an identification card having a photograph of an authorized user. An image determined by processing of the photograph is inscribed by a laser beam in the recording material in proximity to the photograph.

In the known identification card the photograph and the image derived therefrom are perceived as separate graphical elements.

From DE 41 34 539 A1 there is known a recording medium with colored image information. The image information is divided up into at least two information portions which are congruently superimposed and complement each other to form the total information. The information portions are applied in separate working steps. At least one of the information portions is present so as to be inaccessible from outside. In particular, the image information is divided up into a black and white component and a color component. The black and white component is burnt into a transparent film layer of the recording medium as a grayscale image for example by a laser scriber.

The congruent superimposition of the information portions is relatively elaborate and limits the design options in representing the image information.

SUMMARY

The invention is based on the object of preventing any tampering with a graphical representation on a portable data carrier very reliably with reasonable effort.

The inventive portable data carrier has a carrier with a first graphical representation and a second graphical representation. The second graphical representation is better protected against tampering than the first graphical representation. Further, the second graphical representation is configured as a reference for detecting tampering with the first graphical representation. The inventive portable data carrier is characterized by the fact that only a partial area of the first graphical representation laterally overlaps with the second graphical representation and there is no lateral overlap between the first graphical representation and the second graphical representation outside the partial area.

The invention has the advantage that the relatedness of the first and second graphical representations is well recognizable, there is good protection from tampering with the first graphical representation, and the first graphical representation can nevertheless be produced by conventional methods without any appreciable restriction in the freedom of design. Good recognizability of the first graphical representation can be guaranteed because it overlaps with the second graphical representation only in the partial area.

The first graphical representation can be configured to be polychromatic. Further, the portable data carrier can be configured in such a way that the first graphical representation is invisible in the partial area. This obtains a clear separation between the first and second graphical representations and guarantees good recognizability of the second graphical representation. Further, it is possible that the first graphical representation is configured to be transparent, partly transparent or homogeneous in the partial area. This means that account can be taken of the peculiarities of the intended application case.

Preferably, the first graphical representation is produced by printing technology. This permits a high quality level with relatively low production costs.

In a preferred exemplary embodiment of the portable data carrier, the first graphical representation is configured as a photograph of the owner of the portable data carrier.

The second graphical representation can be configured as a grayscale image. Grayscale images can be configured to be very tamper-resistant with reasonable effort.

In a preferred exemplary embodiment, the second graphical representation has a smaller format than the first graphical representation. This has the advantage that only a small surface area is required for the second graphical representation, thus keeping the impairment of the first graphical representation within limits. Another advantage consists in the fact that the effort for producing the second graphical representation is minimized. In particular, the first graphical representation can be at least twice, preferably at least three times, as big as the second graphical representation. Furthermore, the second graphical representation can be formed partially outside the first graphical representation. This permits the impairment of the first graphical representation to be reduced further.

The second graphical representation is preferably configured as an irreversible change in the carrier. This renders tampering with the second graphical representation nearly impossible. Further, the second graphical representation can be formed at least partially inside the carrier. This has the advantage that the access to the second graphical representation that is necessary for tampering is considerably impeded, and it is hardly possible to tamper without visibly damaging the carrier. In particular, the second graphical representation can be configured as a laser inscription. Laser inscriptions have the advantage of being irreversible and thus very tamper-resistant and of involving a technology that is used on a large scale and is thus readily available and relatively inexpensive.

In a preferred exemplary embodiment, the second graphical representation is derived from the first graphical representation. In particular, the second graphical representation represents the same motif as the first graphical representation. This makes it possible to detect by a simple comparison of the first and second graphical representations whether the first graphical representation has been tampered with.

Further, the portable data carrier is preferably so configured that the second graphical representation is visible in the partial area. The partial area is preferably configured as a circular segment, in particular as a quadrant. This permits a placement of the second graphical representation such that the first graphical representation is only slightly influenced. It is further advantageous here when the partial area borders on the outside contour of the first graphical representation. An especially small impairment of the first graphical representation is normally achievable when the partial area is disposed in a corner of the first graphical representation.

The portable data carrier can have a format according to the standard ISO 7810, in particular the format ID-1. Further, the portable data carrier can be configured in particular as an identification document, e.g., in the format ID-3.

The invention relates further to a method for producing a portable data carrier. In the inventive method, a carrier is provided with a first graphical representation and a second graphical representation. The second graphical representation is better protected against tampering than the first graphical representation and is configured as a reference for detecting tampering with the first graphical representation. The peculiarity of the inventive method consists in the fact that only a partial area of the first graphical representation is configured to laterally overlap with the second graphical representation, and there is no lateral overlap between the first graphical representation and the second graphical representation outside the partial area.

It is especially advantageous when the graphical information within the partial area of the first graphical representation is modified before the carrier is provided with the first graphical representation. In this way the partial area can be designed optimally with respect to the second graphical representation. In particular, the first graphical representation can be configured to be transparent, partly transparent or homogeneous in the partial area.

BRIEF DESCRIPTION OF THE DRAWINGS

The invention will hereinafter be explained more closely by the exemplary embodiments shown in the drawing.

There are shown

DETAILED DESCRIPTION OF VARIOUS EMBODIMENTS OF THE DISCLOSURE

Figure 1:
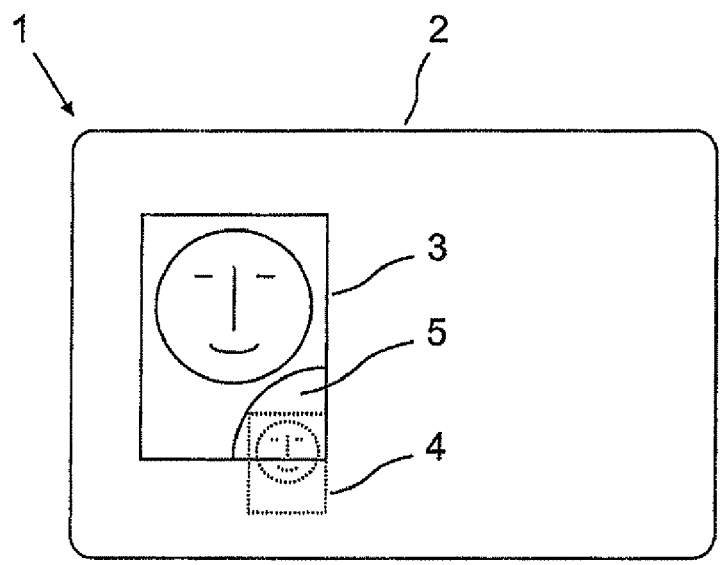
FIG. 1 an exemplary embodiment of a portable data carrier configured according to the invention in a schematic plan view, FIG. 2 the portable data carrier shown in FIG. 1, in a schematic sectional representation, FIG. 3 a schematic representation of the image information underlying the graphic, FIG. 4 the graphic in the form in which it is applied to the carrier of the portable data carrier, and FIG. 5 a schematic representation of the image information of the control graphic.
Figure 2:
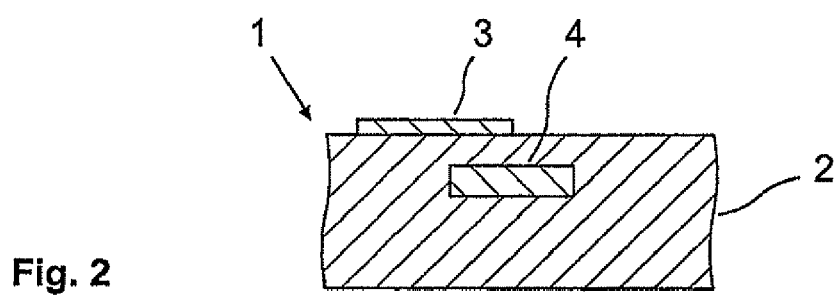

FIG. 1 shows an exemplary embodiment of a portable data carrier 1 configured according to the invention in a schematic plan view. An associated schematic sectional representation is shown in FIG. 2. The portable data carrier 1 is configured for example as an identification card, a health card, a driver's license, etc., and has a card-shaped carrier 2 which is made for example of plastic material. The portable data carrier 1 can be configured according to the standard ISO 7810 and have in particular the format ID-1 or ID-3, i.e., card dimensions having a length between about 85.6 mm to about 125 mm and a height between about 54 mm to about 88 mm. Likewise, the portable data carrier 1 can be configured as a document having one sheet or a plurality of sheets and being preferably made of paper.

On the carrier 2 there are formed a graphic 3 and a control graphic 4, the control graphic 4 being shown by dotted lines for reasons of clarity. The graphic 3 has for example a rectangular format and can be configured in particular as a passport photo of the owner of the portable data carrier 1. Taken alone, the graphic 3 has insufficient protection from tampering and is produced for example by a printing method, in particular retransfer, thermal sublimation, thermotransfer or ink jet printing. The graphic 3 can be configured to be mono- or polychromatic. As indicated by FIG. 2, the graphic 3 is disposed in particular on the surface of the carrier 2.

The control graphic 4 has a smaller format than the graphic 3 and is disposed partially within an overlap area 5 which is configured as a partial area of the graphic 3. Outside the overlap area 5 there is no overlap between the graphic 3 and the control graphic 4. The outside contour of the overlap area 5 is configured in particular as a quadrant. The control graphic 4 is configured so as to be largely tamper-resistant, i.e. an attempt at tampering with the control graphic 4 will lead to visible damage to the portable data carrier 1. For example, the control graphic 4 is inscribed in the carrier 2 by a laser beam. As indicated by FIG. 2, the control graphic 4 is preferably disposed inside a thickness of the carrier 2, i.e., between an upper surface and lower surface of the carrier, so that the carrier 2 is damaged upon tampering with the control graphic 4.

The control graphic 4 can be used to determine whether graphic 3 has been tampered with. For this purpose, the control graphic 4 is so configured that there is a relation between the optical information of the control graphic 4 and the optical information of the graphic 3, so that it is possible to recognize tampering with the graphic 3 by a comparison of the graphic 3 with the control graphic 4. In particular, the control graphic 4 is likewise configured as a passport photo of the owner of the portable data carrier 1. The control graphic 4 here preferably has a lower resolution than the graphic 3 and is not congruently superimposed on the graphic 3 in the overlap area 5, i.e. the image information of the graphic 3 and the image information of the control graphic 4 do not match in the overlap area 5.

The production of the portable data carrier 1 will hereinafter be described by FIGS. 3 to 5.

The portable data carrier 1 is first produced without the graphic 3 and without the control graphic 4. Then the graphic 3 is applied to the carrier 2 of the portable data carrier 1 in particular by printing technology.

Figure 3:
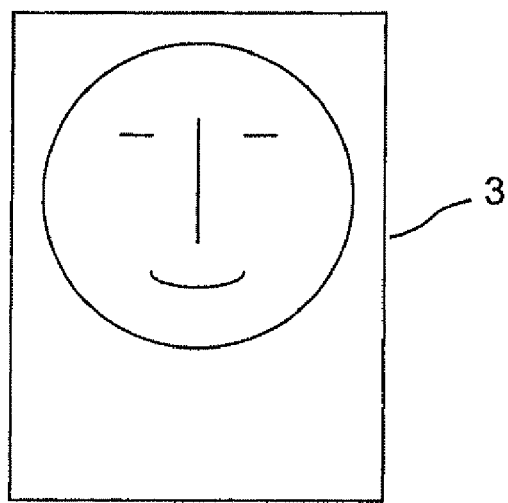

FIG. 3 shows a schematic representation of the image information underlying the graphic 3. Said image information may be for example a passport photograph of the owner of the portable data carrier 1, which is rendered in FIG. 3 by a stylized representation of a face. The image information can be present in color or as a grayscale distribution, preferably in a resolution of at least 300 DPI (dots per inch). Any image formats are in principle possible, whereby a soft frame can be provided and image enhancement measures by means of software can be used. From the image information shown in FIG. 3 the graphic 3 shown in FIG. 4 is determined.

Figure 4:
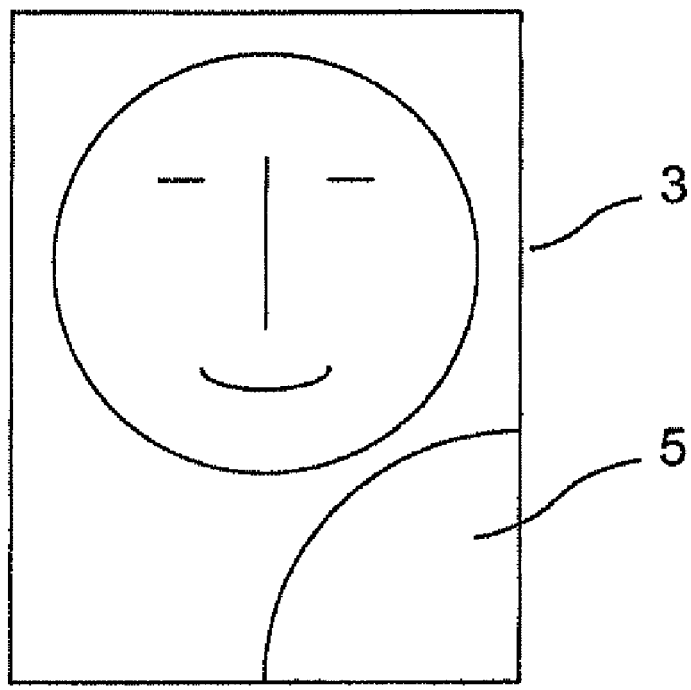
Figure 5:
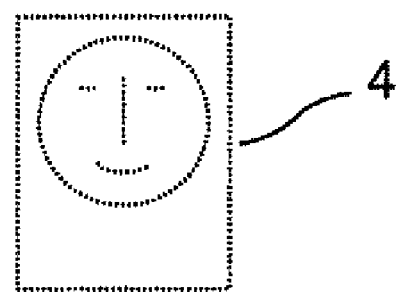

FIG. 4 shows the graphic 3 in the form in which it is applied to the carrier 2 of the portable data carrier 1. The graphic 3 has in the area of its bottom right corner the overlap area 5 which is configured as a circular segment, in particular as a quadrant. Other geometrical forms of the overlap area S are likewise possible. The overlap area 5 can be configured in such a way that the image information of the graphic 3 is invisible there and instead for example a white surface is formed. Likewise, the overlap area 5 can also be configured to be transparent or semitransparent, so that any graphical elements located therebelow are completely visible or show through.

From the image information shown in FIG. 3 the image information of the control graphic 4 is determined. The control graphic 4 preferably has a smaller format than the graphic 3. For example, the size of the control graphic 4 can correspond to one third of the size of the graphic 3. Further, the control graphic 4 is preferably represented as a grayscale image with for example 256 grayscale values. It is also possible to use fewer grayscale values, whereby a strictly black and white representation (two grayscale values) is only suitable to a limited extent. The image information of the control graphic 4 is shown in FIG. 5.

The image information of the control graphic 4 as shown in FIG. 5, which is again shown by dotted lines as in FIG. 1, is inscribed irreversibly in the carrier 2 of the portable data carrier 1 at least partly within the overlap area 5 of the graphic 3 by means of a laser beam. The thus produced portable data carrier 1 is shown in FIG. 1. In the exemplary embodiment of the portable data carrier 1 shown in FIG. 1, the control graphic 4 is disposed partly within and partly outside the graphic 3. The overlap area 5 is so designed here that the image information relevant for use of the graphic 3—i.e. for example the parts of the passport photo required for identifying the owner of the portable data carrier 1, such as the facial contour—are disposed outside the overlap area 5 and thus readily visible. This means that the use of the graphic 3 is not impaired by the control graphic 4. At the same time, the overlap between the graphic 3 and the control graphic 4 makes it clear that there a relation between the graphic 3 and the control graphic 4. Further, the spatial proximity of the graphic 3 and the control graphic 4 facilitates comparison of the graphic 3 with the control graphic 4.

In addition to the graphic 3 and the control graphic 4, the portable data carrier 1 can have further elements which are not shown in the drawing. For example, the portable data carrier 1 can have an integrated circuit for storing and/or processing information. Likewise, the portable data carrier 1 can have a magnetic stripe. There can also be disposed on the portable data carrier 1 one- or multidimensional security elements, such as bar codes, which are applied by printing technology or inscribed by means of a laser.

The invention claimed is:

1. A portable data carrier comprising:
a carrier having a thickness;
a first graphical representation having a partial area and formed on the carrier; and
a second graphical representation formed completely inside the carrier thickness by laser inscription in a way such that the carrier is irreversibly changed,
wherein the second graphical representation is configured in way such that the second graphical representation is shielded against tampering to a greater extent than the first graphical representation, and is configured and related to the first graphical representation in a way such that the second graphical representation is usable as a reference for detecting tampering with the first graphical representation, and
wherein only the partial area of the first graphical representation laterally overlaps with the second graphical representation and there is no lateral overlap between the first graphical representation and the second graphical representation outside the partial area.

2. The portable data carrier according to claim 1, wherein the first graphical representation is configured to be mono- or polychromatic.

3. The portable data carrier according to claim 1, wherein the first graphical representation is invisible in the partial area.

4. The portable data carrier according to claim 1, wherein the first graphical representation is configured to be transparent, partly transparent or homogeneous in the partial area.

5. The portable data carrier according to claim 1, wherein the first graphical representation is produced by printing technology.

6. The portable data carrier according to claim 1, wherein the first graphical representation is configured as a photograph of the owner of the portable data carrier.

7. The portable data carrier according to claim 1, wherein the second graphical representation is configured as a grayscale image.

8. The portable data carrier according to claim 1, wherein the second graphical representation has a smaller format than the first graphical representation.

9. The portable data carrier according to claim 1, wherein the first graphical representation is at least twice as big as the second graphical representation.

10. The portable data carrier according to claim 1, wherein the second graphical representation is formed partially outside the first graphical representation.

11. The portable data carrier according to claim 1, wherein the second graphical representation is derived from the first graphical representation.

12. The portable data carrier according to claim 1, wherein the second graphical representation represents the same motif as the first graphical representation.

13. The portable data carrier according to claim 1, wherein the second graphical representation is visible in the partial area.

14. The portable data carrier according to claim 1, wherein the partial area of the first graphical representation is configured as a circular segment.

15. The portable data carrier according to claim 1, wherein the partial area of the first graphical representation borders on the outside contour of the first graphical representation.

16. The portable data carrier according to claim 1, wherein the partial area of the first graphical representation is disposed in a corner of the first graphical representation.

17. The portable data carrier according to claim 1, wherein the portable data carrier has a card format wherein the portable data carrier has a length between about 85.6 mm to about 125 mm and a height between about 54 mm to about 88 mm.

18. The portable data carrier according to claim 1, wherein the portable data carrier is configured as an identification document.

19. A method for producing a portable data carrier, comprising the steps:
forming a first graphical representation on a carrier having a thickness,
laser inscribing a second graphical representation completely inside the carrier thickness, wherein said laser inscribing irreversibly changes the carrier so that the second graphical representation provides better protection against tampering to a greater extent than the first graphical representation, and
laterally overlapping only a partial area of the first graphical representation with the second graphical representation and forming no lateral overlap between the first graphical representation and the second graphical representation outside the partial area, so that the second graphical representation is usable as a reference for detecting tampering with the first graphical representation.

20. The method according to claim 19, wherein graphical information within the partial area of the first graphical representation is modified before the carrier is provided with the first graphical representation.

21. The method according to claim 19, wherein the first graphical representation is configured to be transparent, partly transparent or homogeneous in the partial area.

* * * * *